United States Patent
Slay, Jr. et al.

(10) Patent No.: US 9,787,759 B2
(45) Date of Patent: Oct. 10, 2017

(54) METHOD AND APPARATUS FOR PROVIDING SHARED USER INTERFACE VIEW

(71) Applicant: Verizon Patent and Licensing Inc., Basking Ridge, NJ (US)

(72) Inventors: Harold Rex Slay, Jr., Valrico, FL (US); Shachi Naren, Tampa, FL (US); Robert A. Kneusel, Lithia, FL (US); Nityanand Sharma, Tampa, FL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 577 days.

(21) Appl. No.: 14/075,788

(22) Filed: Nov. 8, 2013

(65) Prior Publication Data

US 2015/0135082 A1    May 14, 2015

(51) Int. Cl.
| | | |
|---|---|---|
| G06F 3/00 | (2006.01) | |
| G06F 3/048 | (2013.01) | |
| H04L 29/08 | (2006.01) | |
| G06F 9/44 | (2006.01) | |
| G06F 9/54 | (2006.01) | |
| G06F 15/177 | (2006.01) | |
| H04L 12/24 | (2006.01) | |
| H04L 12/26 | (2006.01) | |

(52) U.S. Cl.
CPC ............ *H04L 67/10* (2013.01); *G06F 9/4445* (2013.01); *G06F 9/54* (2013.01); *H04L 41/28* (2013.01); *H04L 67/20* (2013.01); *H04L 41/22* (2013.01); *H04L 41/24* (2013.01); *H04L 43/065* (2013.01)

(58) Field of Classification Search
None
See application file for complete search history.

(56) References Cited

U.S. PATENT DOCUMENTS

| | | | | |
|---|---|---|---|---|
| 5,315,711 A | * | 5/1994 | Barone | G06F 3/14 709/208 |
| 5,553,242 A | * | 9/1996 | Russell | G06F 9/547 709/203 |
| 5,572,652 A | * | 11/1996 | Robusto | G06F 9/4443 714/E11.188 |
| 5,680,549 A | * | 10/1997 | Raynak | H04L 29/06 709/227 |
| 5,754,830 A | * | 5/1998 | Butts | G06F 9/54 370/466 |
| 6,130,668 A | * | 10/2000 | Stein | G09B 5/14 714/E11.188 |

(Continued)

*Primary Examiner* — Yongjia Pan

(57) ABSTRACT

An approach for providing a shared user interface view is described. A user interface view sharing platform may present a user interface view at a first device for interacting with a second device, wherein the first device has an interface to the second device. The user interface view sharing platform may further encode the user interface view, data associated with the first device, other data associated with the second device, or a combination thereof into a data payload. The user interface view sharing platform may also transmit the data payload to a third device, wherein the user interface view, the data associated with the first device, the other data associated with the second device, or a combination thereof is reconstructed at the third device for interacting with the second device via the third device based on the data payload.

19 Claims, 10 Drawing Sheets

(56) References Cited

U.S. PATENT DOCUMENTS

| | | | | |
|---|---|---|---|---|
| 6,370,574 B1* | 4/2002 | House | H04M 3/36 | 379/265.01 |
| 6,385,298 B1* | 5/2002 | Beyda | H04M 3/22 | 379/1.01 |
| 6,438,598 B1* | 8/2002 | Pedersen | G06F 9/542 | 709/203 |
| 6,671,659 B2* | 12/2003 | Troia | G06F 11/2294 | 702/180 |
| 6,687,499 B1* | 2/2004 | Numminen | H04W 24/00 | 370/242 |
| 6,766,165 B2* | 7/2004 | Sharma | H04W 24/00 | 370/241 |
| 7,065,560 B2* | 6/2006 | Erickson | G06F 8/71 | 709/219 |
| 7,788,388 B2* | 8/2010 | Piersol | G06F 9/445 | 709/217 |
| 7,925,729 B2* | 4/2011 | Bush | H04L 12/2807 | 709/223 |
| 8,281,018 B2* | 10/2012 | Heim | H04L 67/141 | 709/227 |
| 8,355,892 B2* | 1/2013 | Kvavle | G05B 23/0256 | 345/173 |
| 8,594,304 B2* | 11/2013 | Werth | G06Q 10/06 | 379/265.01 |
| 8,738,703 B2* | 5/2014 | Spataro | G06F 9/4446 | 709/205 |
| 8,811,595 B2* | 8/2014 | Werth | G06Q 10/06 | 379/265.01 |
| 8,893,009 B2* | 11/2014 | Raleigh | H04M 15/00 | 455/557 |
| 2002/0076025 A1* | 6/2002 | Liversidge | G06Q 10/10 | 379/202.01 |
| 2002/0120786 A1* | 8/2002 | Sehayek | G06Q 10/06 | 719/310 |
| 2003/0208529 A1* | 11/2003 | Pendyala | H04L 29/06 | 709/203 |
| 2005/0114504 A1* | 5/2005 | Marolia | H04M 1/24 | 709/224 |
| 2006/0003810 A1* | 1/2006 | Saikyo | H04W 24/06 | 455/566 |
| 2007/0207800 A1* | 9/2007 | Daley | H04L 41/0803 | 455/425 |
| 2008/0057914 A1* | 3/2008 | Fan | H04W 24/06 | 455/414.1 |
| 2008/0091829 A1* | 4/2008 | Spataro | G06F 9/4446 | 709/227 |
| 2009/0113080 A1* | 4/2009 | Sperling | H04L 67/125 | 710/14 |
| 2011/0137809 A1* | 6/2011 | Klapheke | G06Q 10/00 | 705/304 |
| 2011/0247013 A1* | 10/2011 | Feller | G06F 21/44 | 709/219 |
| 2011/0296059 A1* | 12/2011 | Sperling | H04L 67/125 | 710/14 |
| 2012/0054300 A1* | 3/2012 | Marchwicki | H04W 4/20 | 709/217 |
| 2013/0290475 A1* | 10/2013 | Flagg | H04L 67/18 | 709/217 |
| 2013/0346965 A1* | 12/2013 | Conlan | G06F 8/61 | 717/178 |
| 2014/0196023 A1* | 7/2014 | Bouthillier | G06F 8/61 | 717/178 |

* cited by examiner

METHOD AND APPARATUS FOR PROVIDING SHARED USER INTERFACE VIEW

BACKGROUND INFORMATION

Many devices, including networking devices, require maintenance and repairs by users (e.g., technicians). The maintenance and repairs are normally performed on the devices, or through another devices connected to the devices, at a site the devices are premised. Performing these tasks sometimes require communication and collaboration with other users. However, the devices may be accessible only from the site. The users may have to bring the other person to the devices at the site or may have to deliver task related information over a voice call. Thus, it is inefficient for the users to communicate and collaborate with the other users when the other users are not on at the site with the user.

Therefore, there is a need for a system capable of providing a shared user interface view.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

A method, apparatus, and system for providing a shared user interface view are described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Although the various exemplary embodiments are described with respect to providing a shared user interface view, it is contemplated that these embodiments have applicability to other systems operated by different entities and to other operations wherein data is retrieved.

Figure 1:
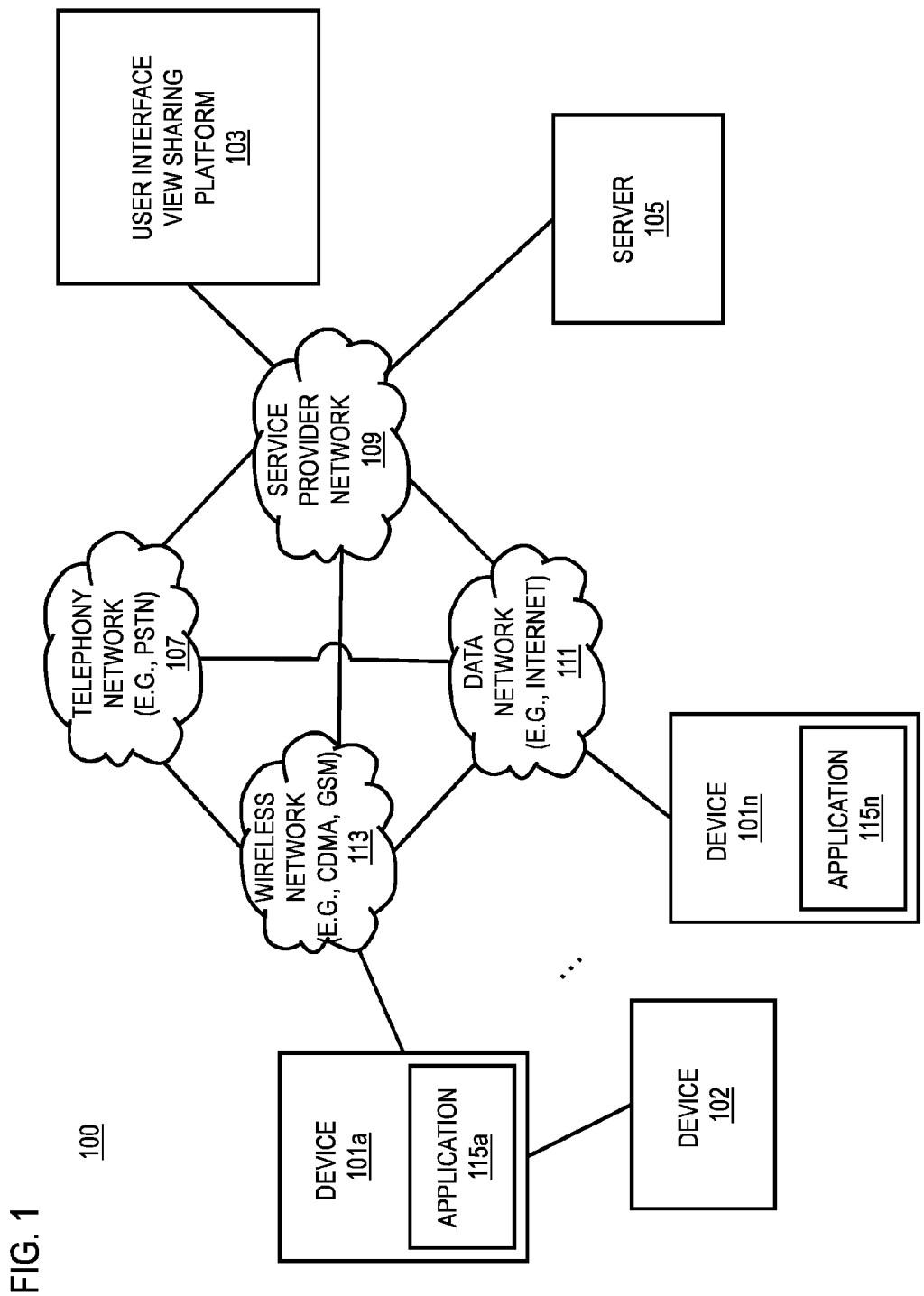
FIG. 1 is a diagram of a system capable of providing a shared user interface view, according to an exemplary embodiment.

FIG. 1 illustrates a system 100 capable of providing a shared user interface view, according to an exemplary embodiment. As noted above, many devices, including networking devices (e.g., multiplexers, repeaters, routers, switches, smartjacks, etc.), are maintained and operated by users (e.g., technicians). The maintenance and operations can be performed on the device itself or by interfacing with another device, such as a monitoring device or a diagnostic device, at the site the device is premised. The users performing the tasks may need to communicate and collaborate with other users. For example, a technician fixing an error on a networking device may need a support from another technician or an authorization from the technician's supervisor to access certain levels of security. However, the other users (e.g., other technicians, supervisors, etc.) may not be on the site or near the users. Further, the devices may be accessible only from the site for a security purpose or due to the nature of the devices. In these situations, the users have to bring the other person to the devices at the site or may have to deliver task related information over a voice call. It is inefficient to bring the other users to the site or go to the other user every time the users need to communicate or collaborate with the other users. In addition, it is difficult to deliver the task related information over the voice call when the task is complicated and requires other users seeing what the users are seeing.

To address this problem, a system 100 of FIG. 1 introduces the capability to provide a shared user interface view. In one embodiment, the system 100 may include a user interface view sharing platform 103 implemented as, for example, part of a service provider network 109 for providing a shared user interface view among devices 101a-101n (collectively, device 101), where a data payload is created from device 101a interfaced with a device 102 and is stored in a server 105. However, in alternative embodiments, the device 101, the user interface view sharing platform 103, and the server 105 may be implemented as any part of the system 100. For example, the device 101 may be implemented as part of the telephony network 107, the service provider network 109, the data network 111, or the wireless network 113 (collectively, networks 107-113). The server 105 may also be implemented as part of the networks 107-113. The service provider network 109 can interact with one or more of other networks (e.g., telephony network 107, data network 111, and the wireless network 113). Also, it is noted that a applications 115a-115n (collectively, application 115) may be implemented as part of the device 101, and the user interface view sharing platform 103 may be implements as part of the device 101 or the application 115.

In certain embodiments, the device 101 may include any type of computing device comprising a mobile handset, mobile phone, mobile station, desktop computer, tablet computer, laptop computer, netbook computer, personal digital assistants (PDAs), smart phone, communication receiver, home phone, media receiver, wearable computer, etc. It is also contemplated that the device 101 may support any type of user interface for supporting the presentment or exchange of data. In addition, the device 101 may facilitate various input means for receiving and generating information, including touch screen capability, keyboard and keypad data entry, voice-based input mechanisms, and the like. Any known and future implementations of the device 101 are applicable. It is noted that, in certain embodiments, the device 101 may be configured to transmit information using a variety of technologies, including near field communication (NFC), radio-frequency identification (RFID), WiFi, Bluetooth®, infrared, etc. Also, connectivity may be provided via a wired or wireless local area network (LAN). For example, the device 101a may interface with the device 102 via an Ethernet communication interface, a Bluetooth communication interface, an USB communication interface, etc., and the device 101a and 101n may communicate with the server 105 via the networks 107-113. Further, the device 101a may have the application 115a installed within the device 101 for interacting with the device 101n, the device 102, and the server 105. As noted above, the device 101 may implement the user interface view sharing platform 103 within the device 101. An example of the device 101 (e.g., mobile terminal) is described in detail below with respect to FIG. 10.

In certain embodiments, the device 102 may include the device 101 and may further include networking devices. Examples of the networking devices include, but not limited to, gateways, routers, switches, bridges, hubs, repeaters, multilayer switches, protocol converters, bridge routers, proxy servers, firewalls, network address translators, multiplexers, network interface devices (e.g., smartjacks), wireless network interface controllers, modems, ISDN terminal adapters, line drivers, etc. As noted above, the device 102 may be interfaced with the device 101 via various communication means. An example of the various communication means is described below with respect to FIG. 3. In one embodiment, the device 102 may be configured to support only LAN or near-field connection and may not support WAN connection. Also, the device 102 may be configured to deny simultaneous accesses by multiple users.

In certain embodiments, the user interface view sharing platform 103 may include a software and/or hardware capable of providing a shared user interface view containing data associated with the device 102 among a plurality of the device 101. For example, the user interface view sharing platform 103 may interface the device 101a with the device 102 (e.g., networking equipment) and present a user interface view (e.g., terminal assist user interface) for interacting with the device 102 at the device 101a. In one embodiment, the user interface view sharing platform 103 may select third party applications based on an equipment type of the device 102, and then generate the user interface view based on the third party applications.

The user interface view sharing platform 103 may further retrieve data from the device 101a and/or other data from the device 102 and encored the user interface view, the data, and/or the other data into a data payload. In one embodiment, the user interface view sharing platform 103 may generate a diagnostic analysis about the device 102 based on the data and/or the other data and then encode the diagnostic analysis into the data payload. In one embodiment, the user interface view sharing platform 103 may determine an accessibility right with respect to the user interface view, the data, and/or the other data and then encode the user interface view, the data, and/or the other data into the data payload based on the accessibility right. In one embodiment, the user interface view sharing platform 103 may determine an accessibility right to the data payload.

In certain embodiments, the user interface view sharing platform 103 may transmit the data payload to the device 101n. In one embodiment, the user interface view sharing platform 103 may transmit the data payload to the server 105 and then the data payload may be transmitted to the device 101n from the server 105. The user interface view sharing platform 103 may reconstruct the diagnostic analysis, the user interface view, the data, and/or the other data at the device 101n, for interacting with the device 102 via the device 101n, based on the data payload. In one embodiment, the user interface view sharing platform 103 may receive interactions with the device 102 at the device 101a and/or the device 101n. The user interface view sharing platform 103 may change a functionality of the device 102 by configuring or programming the device 102. As noted above, the user interface view sharing platform 103 may be implemented as part of the device 101 or the application 115.

In certain embodiments, the server 105 may include a computer system (e.g., software and/or hardware) capable of responding to request across the networks 107-113 to provide a network service. For example, the server 105 may receive a data payload from the device 101a over the networks 107-113 and may store the data payload in a storage (e.g., database) associated with the server 105. Then, the server 105 may transmit the data payload to the device 101n over the networks 107-113 in response to a request from the device 101n. In addition, the server 105 may control an access to the data payload in the storage based on authorization rights associated with the data payload.

For illustrative purposes, the networks 107-113 may be any suitable wireline and/or wireless network, and be managed by one or more service providers. For example, telephony network 107 may include a circuit-switched network, such as the public switched telephone network (PSTN), an integrated services digital network (ISDN), a private branch exchange (PBX), or other like network. Wireless network 113 may employ various technologies including, for example, code division multiple access (CDMA), enhanced data rates for global evolution (EDGE), general packet radio service (GPRS), mobile ad hoc network (MANET), global system for mobile communications (GSM), Internet protocol multimedia subsystem (IMS), universal mobile telecommunications system (UMTS), etc., as well as any other suitable wireless medium, e.g., microwave access (WiMAX), wireless fidelity (WiFi), satellite, and the like. Meanwhile, data network 111 may be any local area network (LAN), metropolitan area network (MAN), wide area network (WAN), the Internet, or any other suitable packet-switched network, such as a commercially owned, proprietary packet-switched network, such as a proprietary cable or fiber-optic network.

Although depicted as separate entities, the networks 107-113 may be completely or partially contained within one another, or may embody one or more of the aforementioned infrastructures. For instance, the service provider network 109 may embody circuit-switched and/or packet-switched networks that include facilities to provide for transport of circuit-switched and/or packet-based communications. It is further contemplated that networks 107-113 may include components and facilities to provide for signaling and/or bearer communications between the various components or facilities of system 100. In this manner, the networks 107-113 may embody or include portions of a signaling system 7 (SS7) network, or other suitable infrastructure to support control and signaling functions.

Figure 2:
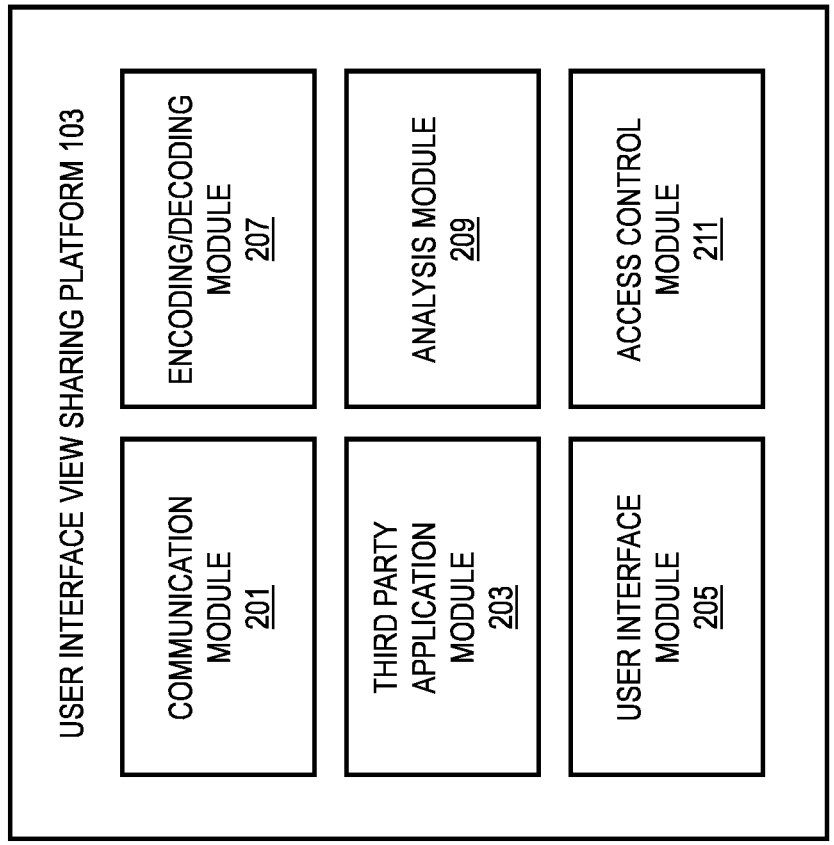
FIG. 2 is a diagram of a user interface view sharing platform utilized in the system of FIG. 1, according to an exemplary embodiment.

FIG. 2 illustrates the user interface view sharing platform 103 utilized in the system 100 of FIG. 1, according to an exemplary embodiment. The user interface view sharing platform 103 may include a communication module 201, a third party application module 203, a user interface module 205, an encoding/decoding module 207, an analysis module 209, and an access control module 211.

In one embodiment, the communication module 201 may be configured to establish a communication channel among the device 101, the device 102, and the server 105 via the networks 107-113. For example, the communication module 201 may establish a communication channel between the device 101a and the device 102 through an Ethernet communication interface, a Bluetooth communication interface, an USB communication interface, etc. An example of utilizing these communication interfaces is described below with respect to FIG. 3. The communication module 201 may also establish a communication channels between the device 101a and the server 105 and between the server 105 and the device 101n through the networks 107-113. Further, the communication module 201 may transmit data (e.g., data payload) through the established communication channels between the device 101 and the server 105.

In one embodiment, the third party application module 203 may be configured to manage third party applications required to communicate and/or interact with the device 102. For example, the third party application module 203 may determine an equipment type of the device 102 and then determine third party applications (e.g., network device application) compatible with the device 102 based on the equipment type. The third party application module 203 may select the third party applications from the available third party applications on the device 101b or may download the third party applications from a third party application provider. In one embodiment, the third party application module 203 may initiate the third party applications in response to a request from the device 101.

In one embodiment, the user interface module 205 may be configured to generate and present a user interface view on the device 101. For example, the user interface module 205 may generate the user interface view based the third party applications managed by the third party application module 203. The user interface module 205 may generate the user interface view that includes features of the third party applications or features to launch the third party applications. Further, the user interface module 205 may present the user interface view via the application 115a at the device 101a for interacting with the device 102, which is interfaced to the device 101a. The user interface module 205 may also present the user interface view at the device 101n for interacting with the device 101a and/or device 102.

In one embodiment, the encoding/decoding module 207 may be configured to encode a user interface view, data associated with the device 101a, and/or other data associated with the device 102 into a data payload and decode the data payload into the user interface, the data, and/or the other data. For example, the encoding/decoding module 207 may encode the user interface view generated by the user interface module 205, the data received from the device 101a, the other data received from the device 102, and/or a diagnostic analysis generated by the analysis module 209 into a data payload (e.g., binary payload). Further, the encoding/decoding module 207 may encode the data, the other data, the user interface view, and/or the diagnostic analysis based on an accessibility right determined by the access control module 211. The encoding/decoding module 207 may also decode the data payload received in the device 101n to reconstruct the user interface view, the data, the other data, and/or the diagnostic analysis from the data payload.

In one embodiment, the analysis module 209 may be configured to analyze data associated with the device 102. For example, the analysis module 209 may analyze the data associated with the device 101a and/or the other data associated with the device 102 and generate a diagnostic analysis about the device 102 based on a diagnostics analysis model. In one embodiment, the analysis module 209 may send a signal or data to the device 102 to test a functionally of the device 102 (e.g., ping test). The analysis module 209 may provide the diagnostic analysis to the user interface module 205 for generating a user interface view including the diagnostic analysis.

In one embodiment, the access control module 211 may be configured to control an access to the user interface view, the data associated with the device 101, the other data associated with the device 102, the diagnostic analysis, and/or the data payload. For example, the access control module 211 may specify accessibility right for the data received from the device 101a, the other data received from the device 102, the diagnostic analysis generated by the analysis module 209, and/or the user interface view generated by the user interface module 205 based on rules specified by the device 101a or access policies. The access control module 211 may control the access to the data, the other data, the user interface view, and/or the diagnostic analysis by the device 101n based on the accessibility rights and/or other accessibility rights associate with the device 101n.

Figure 3:
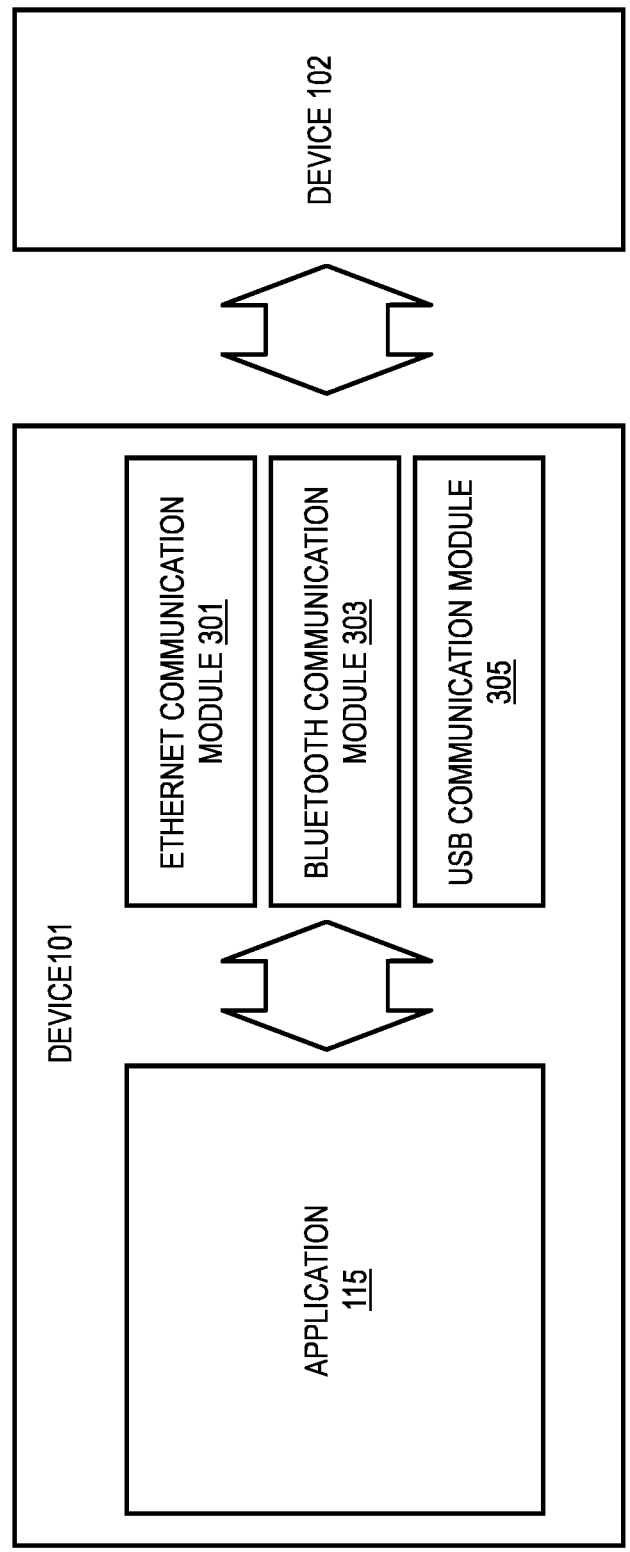
FIG. 3 is a diagram of a communication modules utilized in a first device of FIG. 1, according to an exemplary embodiment.

FIG. 3 illustrates a communication modules utilized in the device 101 of FIG. 1, according to an exemplary embodiment. In one embodiment, the device 101 may be interfaced with the device 102 (e.g., networking devices) via an Ethernet communication module 301, a Bluetooth communication module 303, or an USB communication module 305. For example, the Ethernet communication module 301 may establish a communication channel between the device 101 and the device 102 by establishing a local area network (LAN) via an Ethernet cable. The Bluetooth communication module 303 may establish a communication channel between the device 101 and the device 102 by establishing a wireless personal area network (WPAN) via short-wavelength radio transmissions. The UBS communication module 305 may establish a communication channel between the device 101 and the device 102 by establishing an USB network via an USB cable. In one embodiment, the device 101 may also include a Wi-Fi communication module, a near-field communication (NFC) module, etc. The communication modules may be selected according to an equipment type and/or a communication type of the device 102. The application 115 of the device 101 may interact with the device 102 via the established communication channel and may present a user interface view for interacting with the device 102. For example, the application 114 may perform a ping test or a diagnostic analysis for the device 102 via the Ethernet communication module. These communication interfaces (e.g., Ethernet communication, Bluetooth communication, and USB communication, etc.) may be ideal for a quick and easy connection with the device 102.

Figure 4:
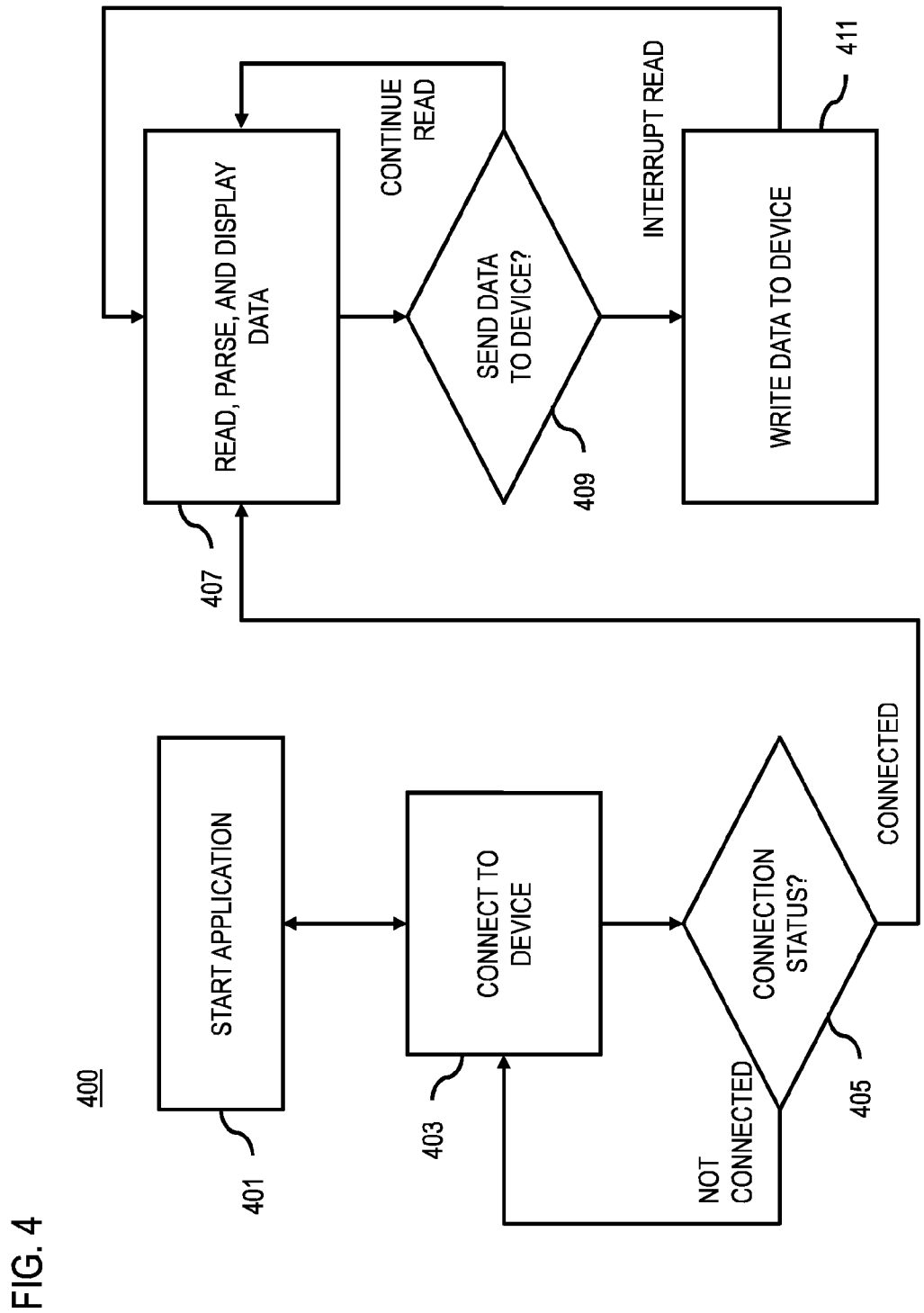
FIG. 4 is a flowchart of a process for communicating with a second device of FIG. 1, according to an exemplary embodiment.

FIG. 4 illustrates a process for communicating with the device 102 of FIG. 1, according to an exemplary embodiment. For example, the application 115 on the device 101a may be started (Step 401) upon a user's request, and then the device 101a may be connected to the device 102 (Step 403). Alternatively, the device 101a may be connected to the device 102 (Step 403) first, and then the application 115 may be started (Step 401). Meantime, the application 115 may check connection status (Step 405) between the device 101a and the device 102. If the device 101a is not connected to the device 102, the device 101a may be retried to connect to the device 102 (Step 403). If the device 101a is connected to the device 102, the application 115 may read, parse, and/or display data received from the device 102 (Step 407). Meantime, the application 115 may check if there is any data to send to the device 102 (Step 409). If there is no data to send to the device 102, the application 115 may continue to read, parse, and/or display the data received from the device 102 (Step 407). If there is the data to be sent to the device 102, the reading, parsing, and/or displaying of the data may be interrupted and the application 115 may write the data to the device 102 (Step 411). After writing the data to the device 102, the application 115 may continue to read, parse, and/or display the data received from the device 102 (Step 407).

Figure 5:
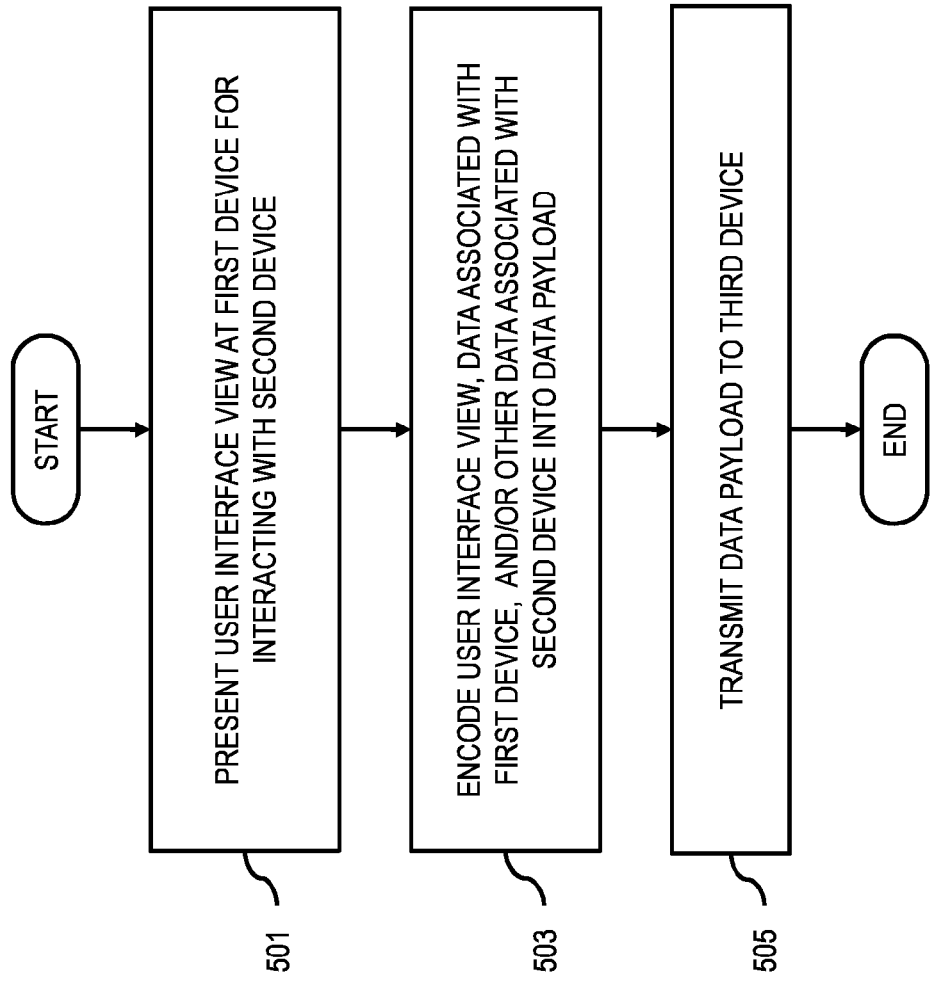
FIGS. 5 and 6 are flowcharts of processes for providing a shared user interface view, according to various exemplary embodiments.
Figure 6:
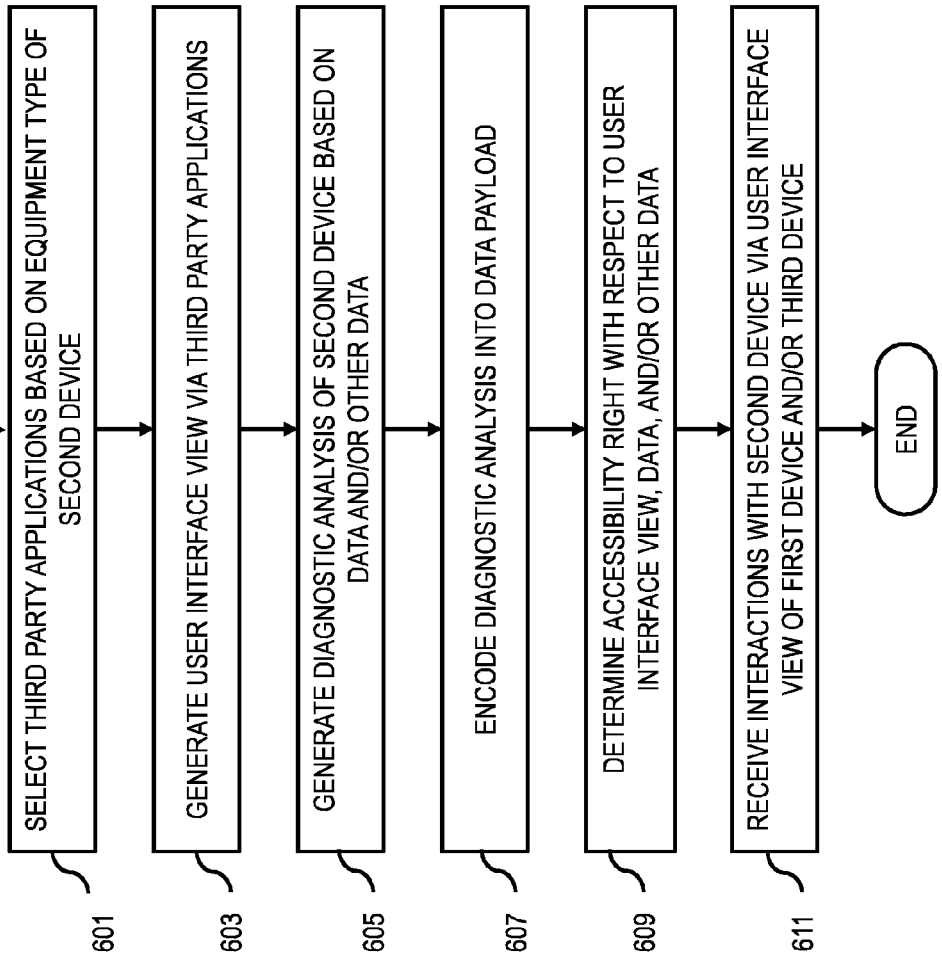

FIGS. 5 and 6 illustrate processes for providing a shared user interface view, according to various exemplary embodiments. For illustrative purposes, the processes 500 and 600 are described with reference to FIG. 1. The steps of the processes 500 and 600 may be performed in any suitable order, as well as combined or separated in any suitable manner.

In particular, FIG. 5 is illustrated to describe the process 500 of providing a shared user interface view from the perspective of the user interface view sharing platform 103. In one embodiment, the user interface view sharing platform 103 may present a user interface view at a first device for interacting with a second device, wherein the first device has an interface to the second device (Step 501). By way of example, the user interface view sharing platform 103 (via the communication module 201) may establish a communication channel between the device 101a and the device 102. The communication channel may be established through an Ethernet communication interface, a Bluetooth communication interface, an USB communication interface, etc. In one embodiment, the second device may be a networking equipment. The networking equipment may include, for example, gateways, routers, switches, bridges, hubs, repeaters, multilayer switches, protocol converters, bridge routers, proxy servers, firewalls, network address translators, multiplexers, network interface devices (e.g., smartjacks), wireless network interface controllers, modems, ISDN terminal adapters, line drivers, etc.

Further, the user interface view may be presented via the application 115a on the device 101a for interacting with the device 102. The user interface view may contain the data associated with the device 101a, the other data associated with the device 102, and/or the diagnostic analysis about the device 102 determined by the analysis module 209. The user interface view may be utilized for interacting with the device 102 through the established communication channel. Further, the user interface view may be utilized for configuring and/or programming the device 102 to change a functionality of the device 102. In one embodiment, the user interface view may include a terminal emulation user interface. By way of example, the user interface view may duplicate (or emulate) the functions of the device 102 via the terminal emulation user interface. The terminal emulation user interface may allow performing a test or a simulation on the device 101a, rather than performing them directly on the device 102.

In one embodiment, the user interface view sharing platform 103 may encode the user interface view, data associated with the first device, other data associated with the second device, or a combination thereof into a data payload (Step 503). By way of example, the user interface view sharing platform 103 (via the encoding/decoding module 207) may encode the user interface view generated by the user interface module 205, the data received from the device 101a and/or the other data received from the device 102 into a data payload. In certain embodiment, the user interface view, the data, and/or the other data, may be encoded into a binary payload. The encoded payload may be decoded to reconstruct the data, the other data, and/or the user interface view.

In one embodiment, the user interface view sharing platform 103 may transmit the data payload to a third device, wherein the user interface view, the data associated with the first device, the other data associated with the second device, or a combination thereof may be reconstructed at the third device for interacting with the second device via the third device based on the data payload. (Step 505). By way of example, the user interface view sharing platform 103 (via the communication module 201) may transmit the data payload encoded in Step 503 to the device 101n. In one embodiment, the data payload may be transmitted to the third device via a server. For example, the data payload may be transmitted from the device 101a to the server 105, and then transmitted from the server 105 to the device 101n, through communication channels established between the device 101a and the server 105 and between the server 105 and the device 101n. The data payload may be transmitted from the device 101a to the device 101n in real-time. Further, the user interface view sharing platform 103 (via the encoding/decoding module 207) may decode the data payload transmitted to the device 101n in Step 505 to restructure the user interface view, the data, and/or the other data from the data payload.

FIG. 6 is illustrated to describe the process 600 of providing a shared user interface view from the perspective of the user interface view sharing platform 103. In one embodiment, the user interface view sharing platform 103 may select one or more third party applications based on an equipment type of the second device (Step 601). By way of example, the user interface view sharing platform 103 (via the third party application module 203) may determine an equipment type of the device 102, and then determine the third party applications (e.g., network device application) compatible with the device 102 based on the equipment type. The third party applications may be selected from the third party applications available on the device 101b or may be downloaded from a third party application provider. In one embodiment, the user interface view sharing platform 103 may generate the user interface view via the one or more third party applications (Step 603). By way of example, the user interface view sharing platform 103, via the user interface module 205, may generate the user interface view based on the third party application determined in Step 601. The generated user interface view may contain features of the third party applications or features to launch the third party applications.

In one embodiment, the user interface view sharing platform 103 may generate a diagnostic analysis of the second device based on the data, the other data, or a combination thereof (Step 605). By way of example, the user interface view sharing platform 103 (via the analysis module 209) may analyze the data associated with the device 101a and/or the data associated with the device 102. Then, the diagnostic analysis about the device 102 may be generated based on a diagnostics analysis model and the data and/or the other data. In one embodiment, a signal or data may be transmitted to the device 102 to test a functionally of the device 102 (e.g., ping test). In one embodiment, the user interface view sharing platform 103 may encode the diagnostic analysis into the data payload, wherein the diagnostic analysis may be reconstructed at the third device based on the data payload (Step 607). By way of example, the user interface view sharing platform 103 (via the encoding/decoding module 207) may encode the diagnostic analysis generated in Step 605 into the data payload (e.g., binary payload). The data payload may be transmitted to the device 101n and decoded (via the encoding/decoding module 207) to restructure the user interface view, the data, and/or the other data from the data payload.

In one embodiment, the user interface view sharing platform 103 may determine an accessibility right with respect to the user interface view, the data, the other data, or a combination thereof, wherein (1) the encoding of the user interface view, the data, the other data, or a combination thereof; (2) the transmitting of the data payload; or (3) a combination thereof may be based on the accessibility right (Step 609). By way of example, the user interface view sharing platform 103 (via the access control module 211) may determine and associate the accessibility rights for the user interface view, the data, and/or the other data based on user specified rules. Then, the user interface view, the data, and/or other data may be encoded on the device 101a based on the accessibility rights. Also, the data payload may be transmitted to the device 101n based on the accessibility rights. The device 101n may be denied to access the data, other data, the user interface, and/or the data payload may be denied based on the accessibility rights.

In one embodiment, the user interface view sharing platform 103 may receive one or more interactions with the second device via the user interface view of the first device, the third device, or a combination thereof (Step 611). By way of example, the user interface view sharing platform 103 (via the communication module 201 and the user interface module 205) may interact with the device 102 via the user interface view of the device 101a and/or the user interface view of the device 101n. The interactions between the device 101a and the device 102 may be generated as the user interface view of the device 101a and the same user interface view may be transmitted to and present on the device 101n. The device 101n may interact with the device 102 via the shared user interface view of the device 101a presented on the device 101n as the user interface view of the device 101n. In one embodiment, the one or more interactions may include a configuration, a programming, or a combination thereof to change a functionality of the second device. By way of example, the user interface view sharing platform 103 may change a setting or a configuration of the device 102 via the user interface view shared between the device 101a and the device 101n. Further, the user interface view sharing platform 103 may update or program software of the device 102 via the user interface view.

Figure 7:
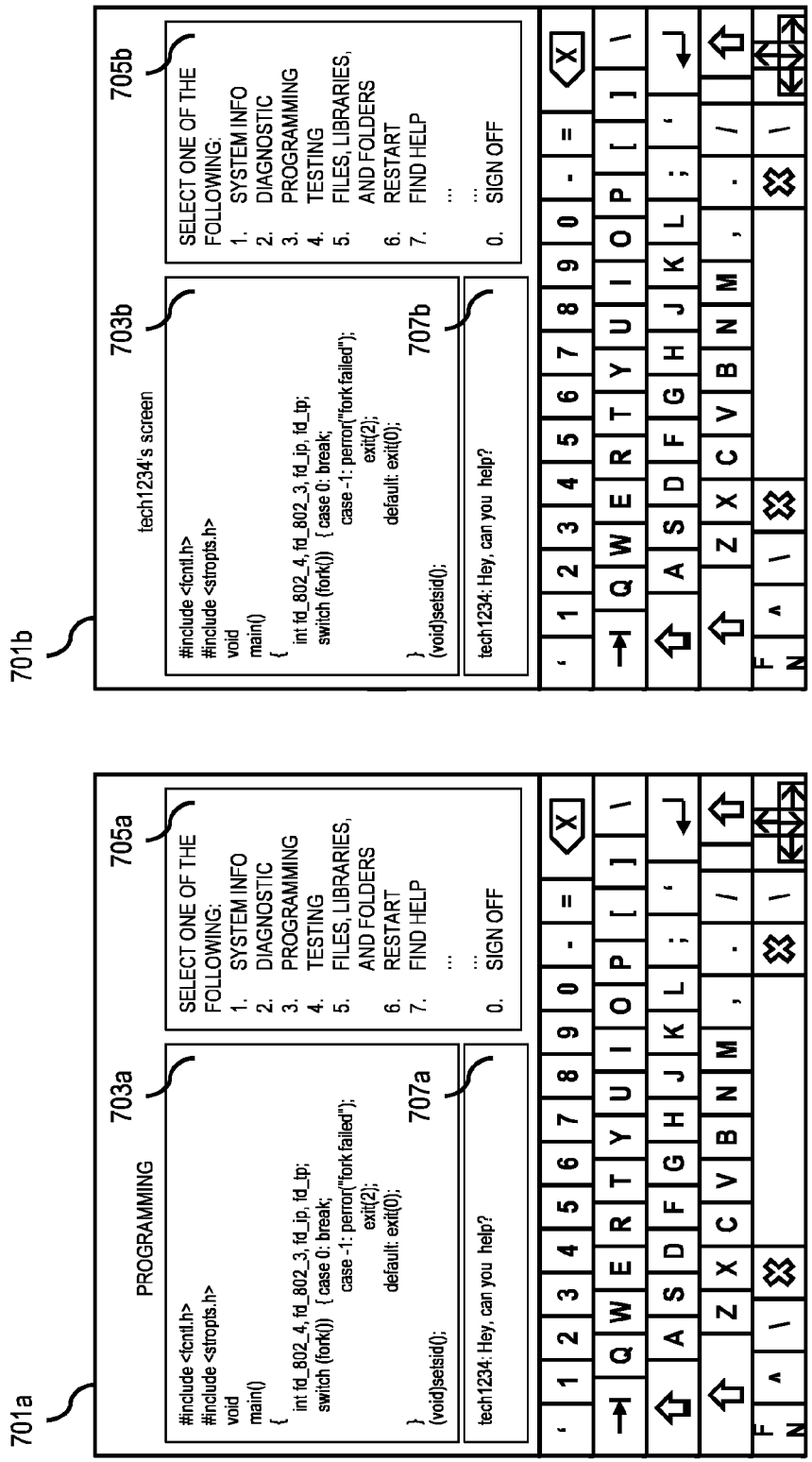
FIG. 7 is a diagram of user interfaces utilized in the processes of FIGS. 5 and 6, according to various exemplary embodiments.

FIG. 7 illustrates user interfaces utilized in the processes of FIGS. 5 and 6, according to various exemplary embodiments. In one scenario, a technician may connect a tablet PC (device 101a) to a network device (device 102) to fix a problem on the networking device. A terminal assist application (application 115) may be started on the tablet PC as the connection is established between the table PC and the networking device. A user interface 701a for interacting with the networking device may be presented via the terminal assist application. The user interface 701a may contain a current task view 703a, a list of selectable action items 705a, a communication box 707a, etc. From the list 705a, the technician may select the "system info" to check system information about the networking device and may select the "diagnostic" to initiate and receive a diagnostic analysis about the networking device. Upon reading the diagnostic analysis, the technician may find out that there is a problem with the software in the networking device. Then, the technician may select the "programming" to edit the codes in the software. The codes may be displayed on the current task view 703a. While editing the codes, the technician may need other technician's help. By selecting the "find help" from the list 705a, other available technician may be found and a communication session may be established between the technician and the other technician via a service server (server 105) over the network (networks 107-113). As the communication session is established, the current task view 703a may be encoded into a binary payload and transmitted to the other technician's tablet PC (device 101n) via the service server. The other technician's tablet PC may also have the terminal assist application (application 115n) that presents the user interface 701b. The user interface 701b may also contain a current task view 703b, a list of selectable action items 705b, and a communication box 707b. The transmitted binary payload may be decoded into its original format at the other technician's table PC and presented in the current task view 703b of the user interface 701b. The other technician may look at the codes presented in the current take view 703b and send messages through the communication box 707b. The technician may receive the other technician's message through the communication box 707a. Also, the other technician may join the programming session and edit the codes by selecting the "programming" from the list 705b. The technicians may test the edited problem by selecting the "testing" from the list 705a or 705b. In addition, the technicians may access necessary resources by selecting the "file libraries and folders" from the list 705a or 705b. After finishing the tasks, the technicians may sign off by selecting the "sign off" from the list 705a or 705b.

The processes described herein for providing a shared user interface view may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 8:
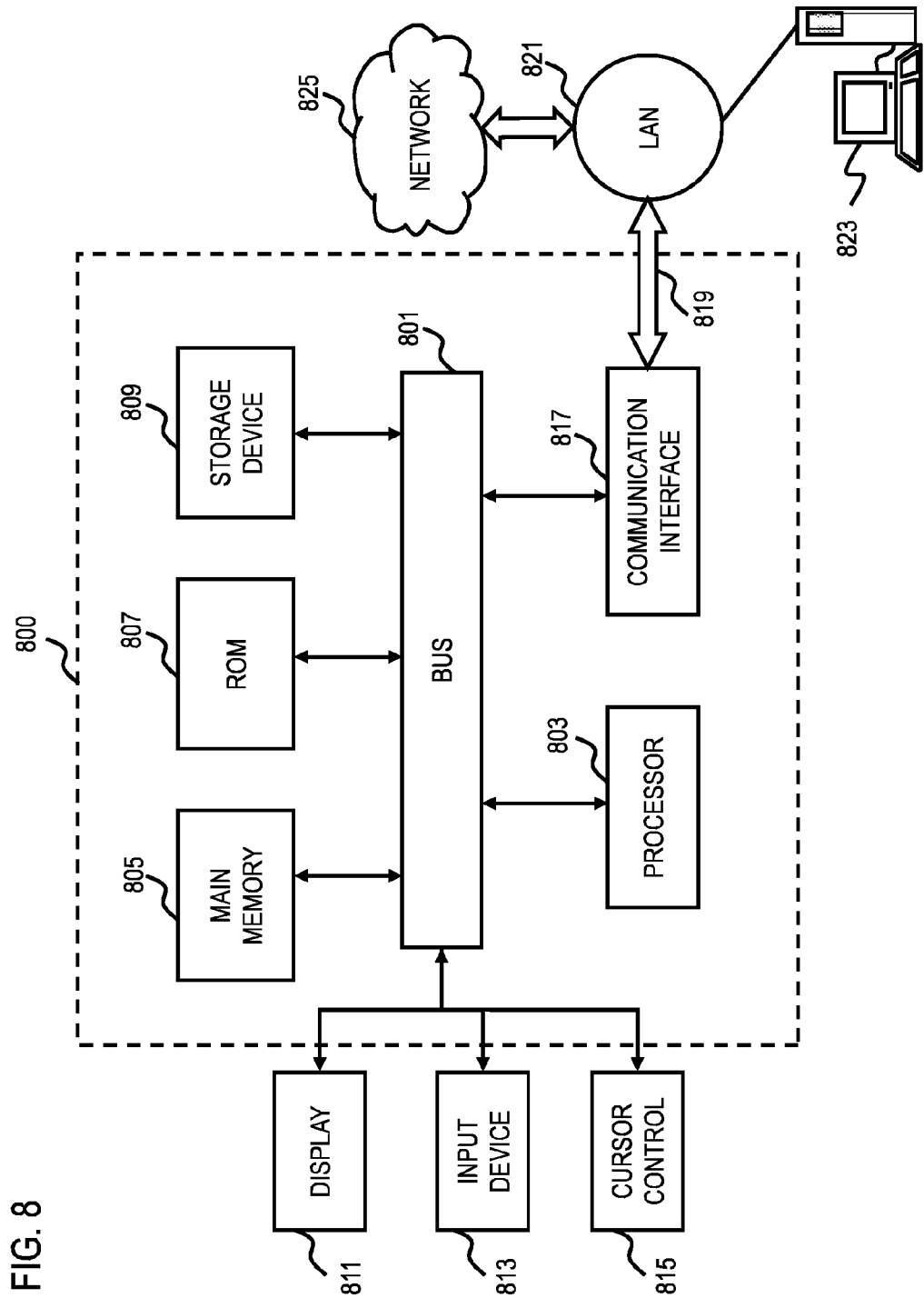
FIG. 8 is a diagram of a computer system that can be used to implement various exemplary embodiments.

FIG. 8 illustrates computer system 800 that can be used to implement various exemplary embodiments. The computer system 800 includes a bus 801 or other communication mechanism for communicating information and a processor 803 coupled to the bus 801 for processing information. The computer system 800 also includes main memory 805, such as random access memory (RAM) or other dynamic storage device, coupled to the bus 801 for storing information and instructions to be executed by the processor 803. Main memory 805 also can be used for storing temporary variables or other intermediate information during execution of instructions by the processor 803. The computer system 800 may further include a read only memory (ROM) 807 or other static storage device coupled to the bus 801 for storing static information and instructions for the processor 803. A storage device 809, such as a magnetic disk or optical disk, is coupled to the bus 801 for persistently storing information and instructions.

The computer system 800 may be coupled via the bus 801 to a display 811, such as a cathode ray tube (CRT), liquid crystal display, active matrix display, or plasma display, for displaying information to a computer user. An input device 813, such as a keyboard including alphanumeric and other keys, is coupled to the bus 801 for communicating information and command selections to the processor 803. Another type of user input device is a cursor control 815, such as a mouse, a trackball, or cursor direction keys, for communicating direction information and command selections to the processor 803 and for controlling cursor movement on the display 811.

According to an embodiment of the invention, the processes described herein are performed by the computer system 800, in response to the processor 803 executing an arrangement of instructions contained in main memory 805. Such instructions can be read into main memory 805 from another computer-readable medium, such as the storage device 809. Execution of the arrangement of instructions contained in main memory 805 causes the processor 803 to perform the process steps described herein. One or more processors in a multi-processing arrangement may also be employed to execute the instructions contained in main memory 805. In alternative embodiments, hard-wired circuitry may be used in place of or in combination with software instructions to implement the embodiment of the invention. Thus, embodiments of the invention are not limited to any specific combination of hardware circuitry and software.

The computer system 800 also includes a communication interface 817 coupled to bus 801. The communication interface 817 provides a two-way data communication coupling to a network link 819 connected to a local network 821. For example, the communication interface 817 may be a digital subscriber line (DSL) card or modem, an integrated services digital network (ISDN) card, a cable modem, a telephone modem, or any other communication interface to provide a data communication connection to a corresponding type of communication line. As another example, communication interface 817 may be a local area network (LAN) card (e.g. for Ethernet™ or an Asynchronous Transfer Mode (ATM) network) to provide a data communication connection to a compatible LAN. Wireless links can also be implemented. In any such implementation, communication interface 817 sends and receives electrical, electromagnetic, or optical signals that carry digital data streams representing various types of information. Further, the communication interface 817 can include peripheral interface devices, such as a Universal Serial Bus (USB) interface, a PCMCIA (Personal Computer Memory Card International Association) interface, etc. Although a single communication interface 817 is depicted in FIG. 8, multiple communication interfaces can also be employed.

The network link 819 typically provides data communication through one or more networks to other data devices. For example, the network link 819 may provide a connection through local network 821 to a host computer 823, which has connectivity to a network 825 (e.g. a wide area network (WAN) or the global packet data communication network now commonly referred to as the "Internet") or to data equipment operated by a service provider. The local network 821 and the network 825 both use electrical, electromagnetic, or optical signals to convey information and instructions. The signals through the various networks and the signals on the network link 819 and through the communication interface 817, which communicate digital data with the computer system 800, are exemplary forms of carrier waves bearing the information and instructions.

The computer system 800 can send messages and receive data, including program code, through the network(s), the network link 819, and the communication interface 817. In the Internet example, a server (not shown) might transmit requested code belonging to an application program for implementing an embodiment of the invention through the network 825, the local network 821 and the communication interface 817. The processor 803 may execute the transmitted code while being received and/or store the code in the storage device 809, or other non-volatile storage for later execution. In this manner, the computer system 800 may obtain application code in the form of a carrier wave.

The term "computer-readable medium" as used herein refers to any medium that participates in providing instructions to the processor 803 for execution. Such a medium may take many forms, including but not limited to non-volatile media, volatile media, and transmission media. Non-volatile media include, for example, optical or magnetic disks, such as the storage device 809. Volatile media include dynamic memory, such as main memory 805. Transmission media include coaxial cables, copper wire and fiber optics, including the wires that comprise the bus 801. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Figure 9:
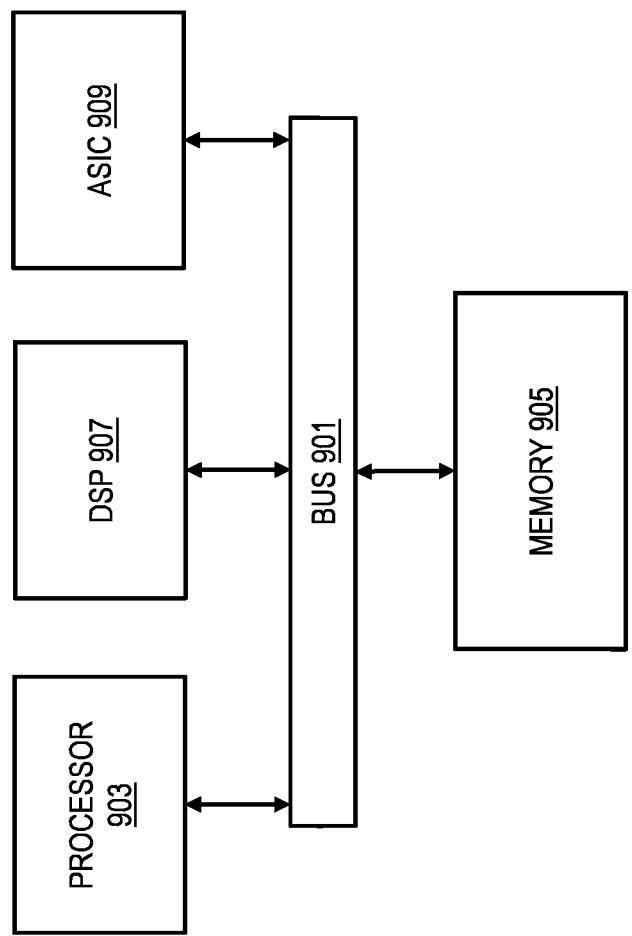
FIG. 9 is a diagram of a chip set that can be used to implement various exemplary embodiments.

FIG. 9 illustrates a chip set 900 that can be used to implement various exemplary embodiments. Chip set 900 is programmed to provide shared user interface view and includes, for instance, the processor and memory components described with respect to FIG. 8 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 900, or a portion thereof, constitutes a means for performing one or more steps of FIGS. 5 and 6.

In one embodiment, the chip set 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein to provide a shared user interface view. The memory 905 also stores the data associated with or generated by the execution of the inventive steps.

Figure 10:
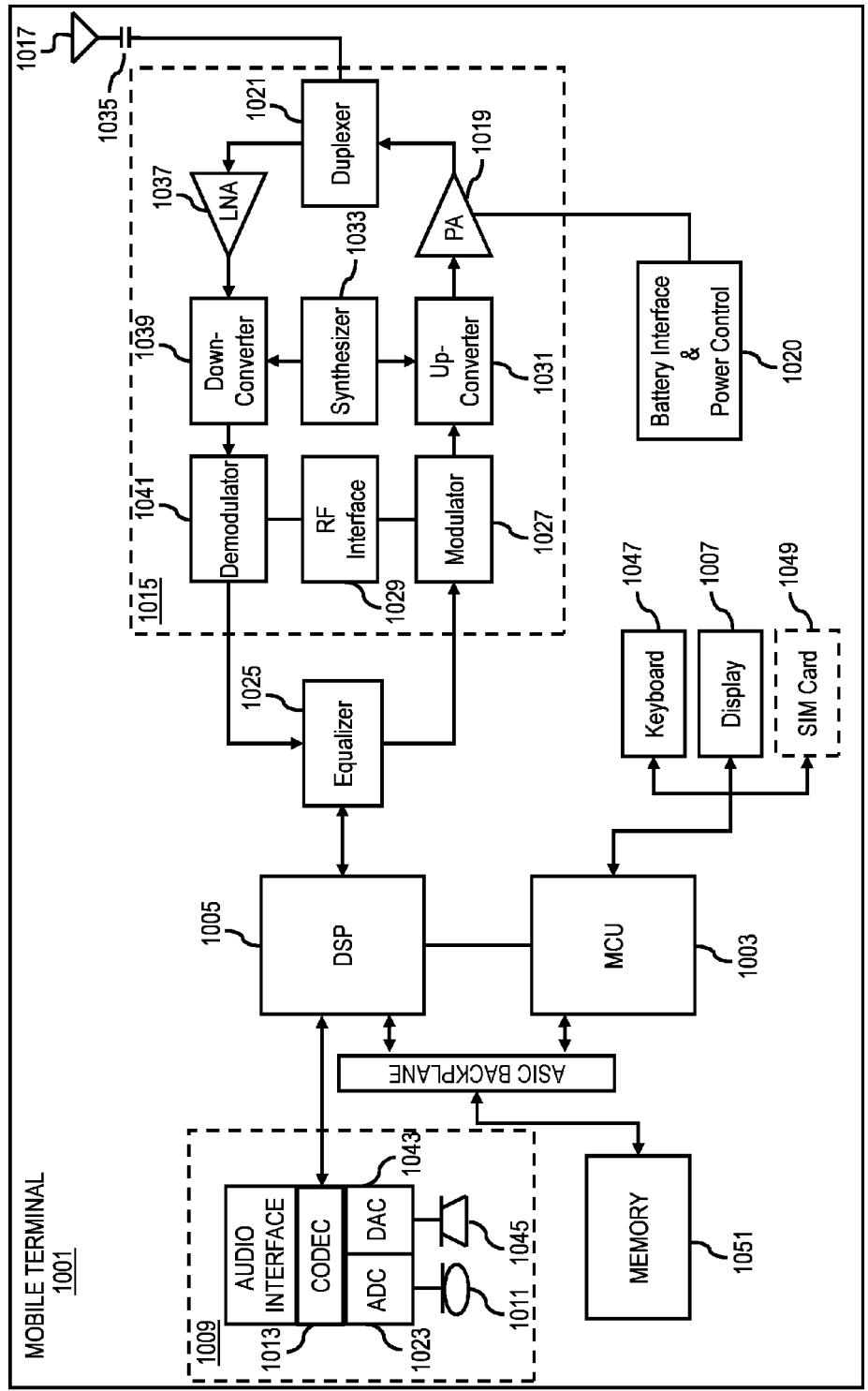
FIG. 10 is a diagram of a mobile terminal that can be used to implement various exemplary embodiments.

FIG. 10 illustrates a mobile terminal (e.g., handset) 1001 that can be used to implement various exemplary embodiments. In some embodiments, the mobile terminal 1001, or a portion thereof, constitutes a means for performing one or more steps of providing a shared user interface view. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1003, a Digital Signal Processor (DSP) 1005, and a receiver/transmitter unit including a microphone gain control unit and a speaker gain control unit. A main display unit 1007 provides a display to the user in support of various applications and mobile terminal functions that perform or support the steps of providing a shared user interface view. The display 1007 includes display circuitry configured to display at least a portion of a user interface of the mobile terminal (e.g., mobile telephone). Additionally, the display 1007 and display circuitry are configured to facilitate user control of at least some functions of the mobile terminal. An audio function circuitry 1009 includes a microphone 1011 and microphone amplifier that amplifies the speech signal output from the microphone 1011. The amplified speech signal output from the microphone 1011 is fed to a coder/decoder (CODEC) 1013.

A radio section 1015 amplifies power and converts frequency in order to communicate with a base station, which is included in a mobile communication system, via antenna 1017. The power amplifier (PA) 1019 and the transmitter/modulation circuitry are operationally responsive to the MCU 1003, with an output from the PA 1019 coupled to the duplexer 1021 or circulator or antenna switch, as known in the art. The PA 1019 also couples to a battery interface and power control unit 1020.

In use, a user of mobile terminal 1001 speaks into the microphone 1011 and his or her voice along with any detected background noise is converted into an analog voltage. The analog voltage is then converted into a digital signal through the Analog to Digital Converter (ADC) 1023. The control unit 1003 routes the digital signal into the DSP 1005 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1025 for compensation of any frequency-dependent impairments that occur during transmission though the air such as phase and amplitude distortion. After equalizing the bit stream, the modulator 1027 combines the signal with a RF signal generated in the RF interface 1029. The modulator 1027 generates a sine wave by way of frequency or phase modulation. In order to prepare the signal for transmission, an up-converter 1031 combines the sine wave output from the modulator 1027 with another sine wave generated by a synthesizer 1033 to achieve the desired frequency of transmission. The signal is then sent through a PA 1019 to increase the signal to an appropriate power level. In practical systems, the PA 1019 acts as a variable gain amplifier whose gain is controlled by the DSP 1005 from information received from a network base station. The signal is then filtered within the duplexer 1021 and optionally sent to an antenna coupler 1035 to match impedances to provide maximum power transfer. Finally, the signal is transmitted via antenna 1017 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1001 are received via antenna 1017 and immediately amplified by a low noise amplifier (LNA) 1037. A down-converter 1039 lowers the carrier frequency while the demodulator 1041 strips away the RF leaving only a digital bit stream. The signal then goes through the equalizer 1025 and is processed by the DSP 1005. A Digital to Analog Converter (DAC)

1043 converts the signal and the resulting output is transmitted to the user through the speaker 1045, all under control of a Main Control Unit (MCU) 1003 which can be implemented as a Central Processing Unit (CPU).

The MCU 1003 receives various signals including input signals from the keyboard 1047. The keyboard 1047 and/or the MCU 1003 in combination with other user input components (e.g., the microphone 1011) comprise a user interface circuitry for managing user input. The MCU 1003 runs a user interface software to facilitate user control of at least some functions of the mobile terminal 1001 to provide a shared user interface view. The MCU 1003 also delivers a display command and a switch command to the display 1007 and to the speech output switching controller, respectively. Further, the MCU 1003 exchanges information with the DSP 1005 and can access an optionally incorporated SIM card 1049 and a memory 1051. In addition, the MCU 1003 executes various control functions required of the terminal. The DSP 1005 may, depending upon the implementation, perform any of a variety of conventional digital processing functions on the voice signals. Additionally, DSP 1005 determines the background noise level of the local environment from the signals detected by microphone 1011 and sets the gain of microphone 1011 to a level selected to compensate for the natural tendency of the user of the mobile terminal 1001.

The CODEC 1013 includes the ADC 1023 and DAC 1043. The memory 1051 stores various data including call incoming tone data and is capable of storing other data including music data received via, e.g., the global Internet. The software module could reside in RAM memory, flash memory, registers, or any other form of writable storage medium known in the art. The memory device 1051 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1049 carries, for instance, important information, such as the cellular phone number, the carrier supplying service, subscription details, and security information. The SIM card 1049 serves primarily to identify the mobile terminal 1001 on a radio network. The card 1049 also contains a memory for storing a personal telephone number registry, text messages, and user specific mobile terminal settings.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
presenting a user interface view at a first device, the user interface view includes a terminal emulation user interface configured for interacting with a second device to perform testing of the second device, wherein the second device includes a networking device configured to provide networking functions within a communication network;
generating a diagnostic analysis of the networking device based on data provided by the first device, other data provided by the networking device, or a combination thereof;
presenting the terminal emulation user interface as a reconstructed view on a third device for assistance in testing the networking equipment,
wherein the user interface view at the first device and the reconstructed view at the third device are presented concurrently, the reconstructed view at the third device corresponding to the user interface view at the first device to form a shared view between the third device and the first device; and
requesting, via the first device, authorization from the third device to access the second device according to one of a plurality of security levels.

2. A method of claim 1, further comprising:
receiving one or more interactions with the second device via the user interface view of the first device, the third device, or a combination thereof.

3. A method of claim 2, wherein the one or more interactions include a programming change, to change a functionality of the second device.

4. A method of claim 1, further comprising:
selecting one or more third party applications based on an equipment type of the second device; and
generating the user interface view at the first device via the one or more third party applications and generating the reconstructed view at the third device based on the one or more third party applications.

5. A method of claim 1, further comprising:
encoding the diagnostic analysis into a data payload, and transmitting the data payload to the third device via a server,
wherein the diagnostic analysis is reconstructed at the third device based on the data payload.

6. A method of claim 1, further comprising:
encoding the user interface view and data associated with the first device, other data associated with the second device, or a combination thereof into a data payload; and
transmitting the data payload to the third device,
wherein the user interface view and the data associated with the first device, the other data associated with the second device, or a combination thereof is used to form a reconstructed view at the third device for interacting with the second device via the third device based on the data payload.

7. A method of claim 6, further comprising:
determining an accessibility right with respect to the user interface view, the data, the other data, or a combination thereof,
wherein (1) the encoding of the user interface view, the data, the other data, or a combination thereof; (2) the transmitting of the data payload; or (3) a combination thereof is based on the accessibility right.

8. An apparatus comprising a processor configured to:
present a user interface view at a first device, the user interface view includes a terminal emulation user interface configured for interacting with a second device to perform testing of the second device, wherein the second device includes a networking device configured to provide networking functions within a communication network;
generate a diagnostic analysis of the networking device based on data provided by the first device, other data provided by the networking device, or a combination thereof;
present the terminal emulation user interface as a reconstructed view on a third device for assistance in testing the networking equipment, wherein the user interface view at the first device and the reconstructed view at the third device are presented concurrently, the reconstructed view at the third device corresponding to the user interface view at the first device to form a shared view between the third device and the first device; and request, via the first device, authorization from the third device to access the second device according to one of a plurality of security levels.

9. An apparatus of claim 8, wherein the processor is further configured to:
receive one or more interactions with the second device via the user interface view of the first device, the third device, or a combination thereof.

10. An apparatus of claim 9, wherein the one or more interactions include a programming change, to change a functionality of the second device.

11. An apparatus of claim 8, wherein the processor is further configured to:
select one or more third party applications based on an equipment type of the second device; and
generate the user interface view at the first device via the one or more third party applications and the user interface view at the third device via the one or more applications.

12. An apparatus of claim 8, wherein the processor is further configured to:
encode the diagnostic analysis into a data payload, and transmitting the data payload to the third device via a server,
wherein the diagnostic analysis is reconstructed at the third device based on the data payload.

13. An apparatus of claim 8, wherein the processor is further configured to:
encode the user interface view and data associated with the first device, other data associated with the second device, or a combination thereof into a data payload; and
transmit the data payload to the third device,
wherein the user interface view and the data associated with the first device, the other data associated with the second device, or a combination thereof is used to form a reconstructed view at the third device for interacting with the second device via the third device based on the data payload.

14. An apparatus of claim 13, wherein the processor is further configured to:
determine an accessibility right with respect to the user interface view, the data, the other data, or a combination thereof,
wherein (1) the encoding of the user interface view, the data, the other data, or a combination thereof; (2) the transmitting of the data payload; or (3) a combination thereof is based on the accessibility right.

15. A system comprising a platform configured to:
present a user interface view at a first device, by a processor of the first device, the user interface view includes a terminal emulation user interface configured for interacting with a second device to perform testing of the second device, wherein the second device includes a networking device configured to provide networking functions within a communication network;

generate a diagnostic analysis of the networking device based on data provided by the first device, other data provided by the networking device, or a combination thereof;

present the terminal emulation user interface as a reconstructed view on a third device for assistance in testing the networking equipment, wherein the user interface view at the first device and the reconstructed view at the third device are presented concurrently, the reconstructed view at the third device corresponding to the user interface view at the first device to form a shared view between the third device and the first device; and request, via the first device, authorization from the third device to access the second device according to one of a plurality of security levels.

16. A system of claim 15, wherein the platform is further configured to:
select one or more third party applications based on an equipment type of the second device; and
generate the user interface view at the first device via the one or more third party applications and the user interface view at the third device via the one or more third party applications.

17. A system of claim 15, wherein the platform is further configured to:
encode the diagnostic analysis into a data payload, and transmit the data payload to the third device via a server;
wherein the diagnostic analysis is reconstructed at the third device based on the data payload.

18. A system of claim 15, wherein the platform is further configured to:
encode the user interface view and data associated with the first device, other data associated with the second device, or a combination thereof into a data payload; and
transmit the data payload to the third device,
wherein the user interface view and the data associated with the first device, the other data associated with the second device, or a combination thereof is used to form a reconstructed view at the third device for interacting with the second device via the third device based on the data payload.

19. A system of claim 18, wherein the platform is further configured to:
determine an accessibility right with respect to the user interface view, the data, the other data, or a combination thereof,
wherein (1) the encoding of the user interface view, the data, the other data, or a combination thereof; (2) the transmitting of the data payload; or (3) a combination thereof is based on the accessibility right.

* * * * *